United States Patent [19]

Belew

[11] Patent Number: 4,674,533

[45] Date of Patent: Jun. 23, 1987

[54] REMOTELY CONTROLLABLE MIXING SYSTEM

[75] Inventor: Robert R. Belew, Huntsville, Ala.

[73] Assignee: The United States of America as represented by the Administrator of the National Aeronautics and Space Administration, Washington, D.C.

[21] Appl. No.: 875,891

[22] Filed: Jun. 18, 1986

Related U.S. Application Data

[63] Continuation-in-part of Ser. No. 751,691, Jul. 3, 1985.

[51] Int. Cl.$^4$ .............................................. F16K 11/16
[52] U.S. Cl. .................................. 137/595; 137/606; 251/165
[58] Field of Search ................... 137/606, 625.31, 595; 251/164, 165, 166

[56] References Cited

U.S. PATENT DOCUMENTS

| 904,307 | 11/1908 | Chandler | 251/165 |
| 3,152,615 | 10/1964 | Olson | 137/595 X |
| 4,436,108 | 3/1984 | Ellsworth | 137/606 X |

FOREIGN PATENT DOCUMENTS 8382 of 1893 United Kingdom ................ 251/164

Primary Examiner—Robert G. Nilson
Attorney, Agent, or Firm—Joseph H. Beumer; John R. Manning; Leon D. Wofford, Jr.

[57] ABSTRACT

A remotely controllable mixing system (210) in which a plurality of mixing assemblies (10a-10e) are arranged in an annular configuration, and wherein each assembly (10) employs a central chamber (16) and two outer, upper and lower, chambers (12, 14). Valves (18, 20) are positioned between chambers, and these valves (18, 20) for a given mixing assembly (10) are operated by upper and lower control rotors (29), which in turn are driven by upper and lower drive rotors (270, 270b). Additionally, a hoop (278) is compressed around upper control rotors (29) and a hoop (278b) is compressed around lower control rotors (29) to thus insure constant frictional engagement between all control rotors (29) and drive rotors (270, 270b). The drive rollers (270, 270b) are driven by a motor (213).

8 Claims, 5 Drawing Figures

REMOTELY CONTROLLABLE MIXING SYSTEM

ORIGIN OF THE INVENTION

The invention described herein was made by an employee of the United States Government and may be manufactured and used by or for the government for governmental purposes without the payment of any royalties thereon or therefor.

CROSS-REFERENCE TO RELATED APPLICATION

This application is a continuation-in-part of application Ser. No. 751,691, filed July 3, 1985, entitled "Dual Motion Valve With Single Motion Input."

TECHNICAL FIELD

This invention relates generally to controllable mixing systems and particularly to a mixing system wherein a plurality of mixing assemblies are simultaneously controlled for the mixing of fluids.

BACKGROUND OF THE INVENTION

Certain types of chemical experiments require the automated control or some form of remote control of interaction of discrete fluids, as by the transfer or coupling of fluids. In the parent case, there is disclosed, and a portion of the disclosure is repeated here for purposes of continuity, a mixing system wherein fluids are controllably admitted or coupled to fluids in an inner chamber from a pair of adjacent outer chambers. This is accomplished by means of valves separating the chambers, and as discussed in the parent case, and herein, a number of these mixing chambers are employed. A remaining problem, however, is that of determining a system for simultaneous control of the mixing chambers as a group.

SUMMARY OF THE INVENTION

In accordance with this invention, a mixing system is constructed wherein a group of mixing assemblies are arranged in an annular configuration. Each of these mixing assemblies employs a central chamber and two outer chambers, and valves are positioned between the chambers to enable the introduction to the central chamber of fluids initially stored in the outer chambers. Each of the two valves of each mixing assembly is operated by a control rotor, there being a control rotor at each end of each mixing assembly. Sets of these control rotors are thus positioned annularly in accordance with the annular configuration of the system, and the control rotors are driven to open and close all of the valves of the mixing assemblies together. This is accomplished by two drive rollers operating on a common shaft, one of the drive rotors engaging control rotors at one end of of the mixing system and the other drive rotor engaging control rotors at an opposite end. This shaft is in turn drivable, as by a motor, and it thus enables remote control of the system.

DESCRIPTION OF THE PREFERRED EMBODIMENT

Figure 1:
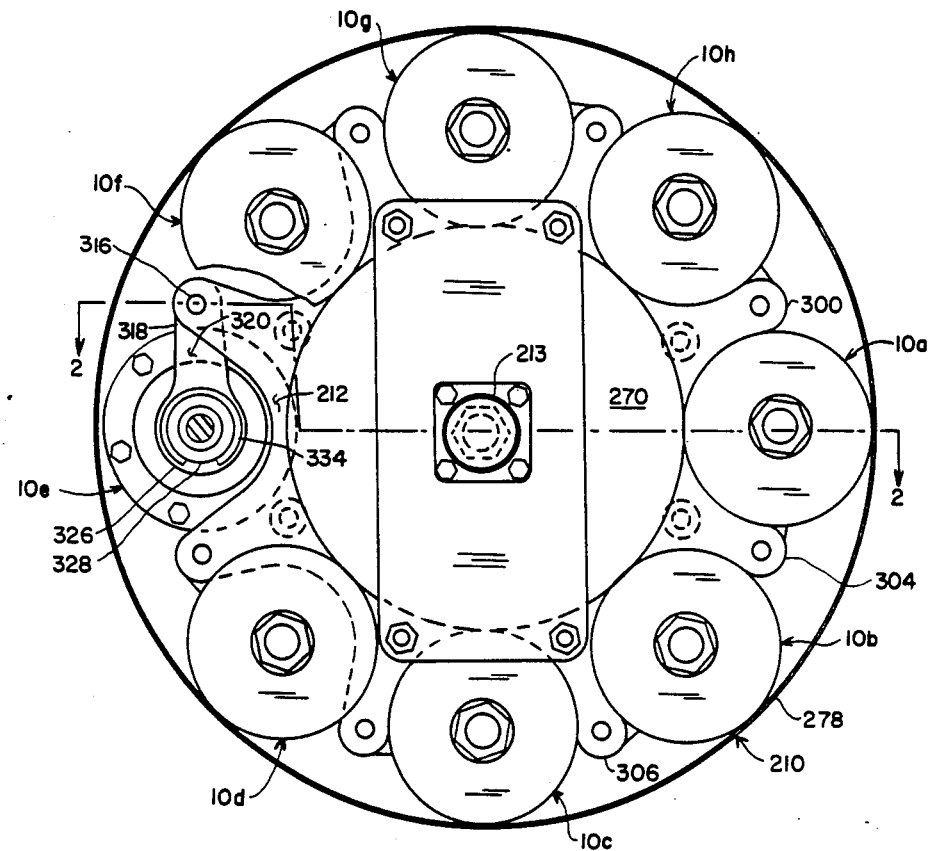
FIG. 1 is an end view, partially cut away and partially shown in dotted lines, of an embodiment of the invention.
Figure 2:
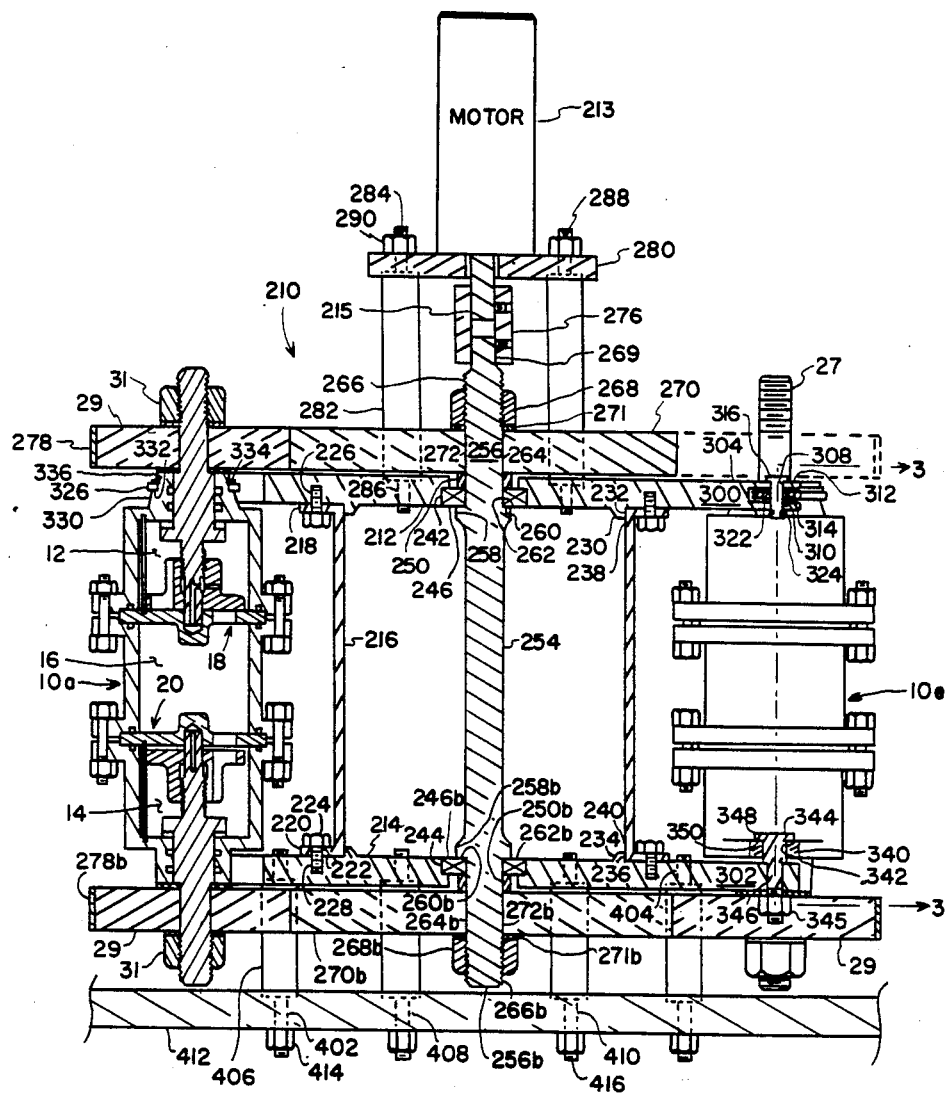
FIG. 2 is a sectional view taken along line 2—2 of FIG. 1.
Figure 3:
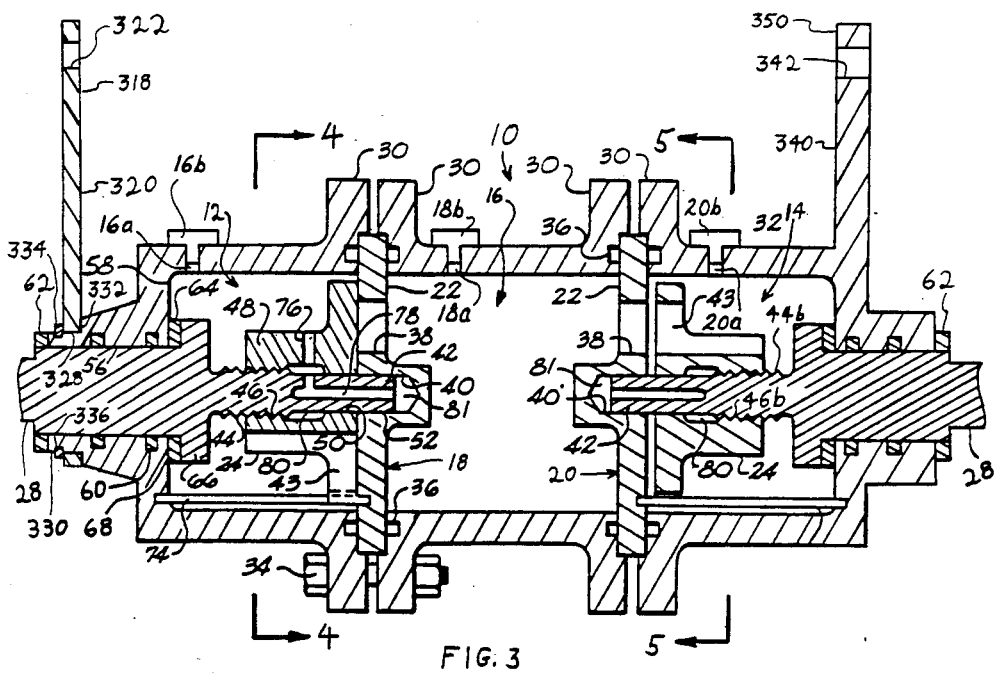
FIG. 3 is a sectional view taken along line 3—3 of FIG. 2.

Referring to the drawings, FIGS. 1, 2 and 3 illustrate a plurality of chemical mixing assemblies 10a–10h wherein each assembly includes a pair of outer chambers 12 and 14 and a central chamber 16 which are interconnected by valves 18 and 20. The valves are simultaneously controlled by central drive members 270 and 270b to control fluid coupling between outer chambers 12 and 14 and central chamber 16.

Figure 4:
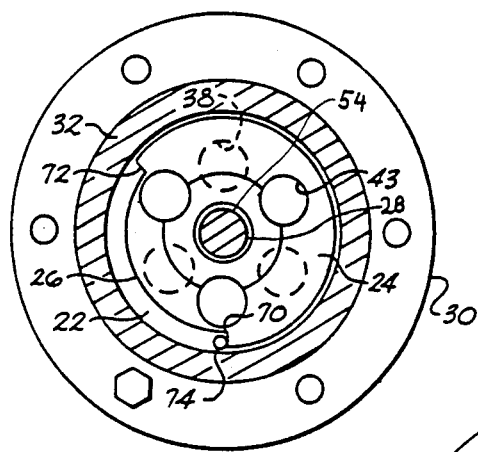
FIG. 4 is a sectional view taken along line 4—4 of FIG. 3.
Figure 5:
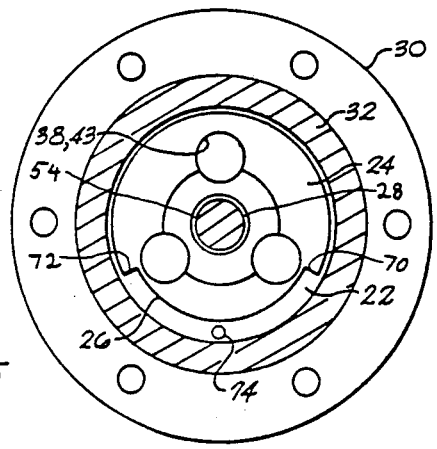
FIG. 5 is a sectional view taken along line 5—5 of FIG. 3.

To best understand this invention, reference is next made to FIGS. 3, 4, and 5 which particularly illustrate the structure and operation of a single mixing assembly 10. Valves 18 and 20 are designed to minimize fluid turbulence and convection mixing during their opening and closing and to promote the combining of fluids by diffusion mixing only. The valves are actuated simultaneously, and their manner of operation is indentical. Fill ports 16a, 18a, 20a with closure caps 16b, 18b and 20b are used to introduce fluid into chambers 12, 14, and 16. These chambers typically carry various organic solutions which are to be combined, for example, through diffusion mixing to obtain organic crystals.

In FIG. 3, valve 18 is shown in its closed position, and valve 20 is shown in its open position. When valve 18 is open, fluid carried in chamber 12 may flow to central or intermediate chamber 16. Likewise, when valve 20 is in its open position, fluid carried in chamber 14 may flow to chamber 16.

Each of valves 18 and 20 include a stationary valve plate 22, a rotary valve plate 24 having a slot or notch 26, a threaded spindle 28 on which rotary valve plate 24 is carried for rotation, and a spindle drive rotor 29 (FIG. 2) for providing a rotary input to spindle 28.

Stationary valve plate 22 of each valve assembly 18 and 20 is fixedly mounted perpendicularly between adjacent reaction chambers 12, 14, and 16. Each stationary valve plate 22 has three equally spaced stationary valve plate openings or ports 38 plus a receiving bore 40 for accommodating an end 42 of threaded spindle 28. Reaction chambers 12, 14, and 16 are held together with bolt flanges 30 which are constructed integrally with their respective chamber outer shells 32. Bolts 34 passing through bolt flanges 30 force reaction chambers 12, 14, and 16 tightly together, and flange gaskets 36 seal bolt flange 30 areas against fluid leakage.

Rotary valve plate 24 of each valve assembly 18 and 20 is essentially disc-shaped and is carried for rotation and axial movement in its respective chamber by means of its threaded spindle 28, which in turn has a threaded region 27 for mounting drive rotor 29. Each rotary valve plate 24 has three equally spaced rotary valve openings or ports 43 which are aligned with stationary valve plate ports 38 to provide passageways between adjacent reaction chambers 12, 14, and 16. External threads 44 of spindle 28 mate with a light interference fit with internal threads 46 of a boss 48 carried at the center of rotary valve plate 24. The light interference fit enables rotary valve plate 24 and threaded spindle 28 to rotate together as a single unit when spindle 28 receives a rotary input from drive rotor 29. Valve assembly 20 requires spindle threads 44b and plate threads 46b to be opposite in direction to spindle threads 44 and plate threads 46 of valve assembly 18. In addition to the mating of threads 46 and 44 of rotary valve plate 24 and spindle 28, mating also occurs between an aligning hole 50 and an aligning shaft portion 52 of spindle 28 to assure axial symmetry between rotary valve plate 24 and spindle 28. Aligning shaft portion 52 is also carried in receiving bore 40 of stationary valve plate 22. This further ensures axial symmetry between rotary valve plate 24 and stationary valve plate 22 for providing good sealing characteristics when valve mechanism 18 or 20 is in the closed position and also for minimizing friction during opening and closing of valve mechanism 18 or 20.

Each threaded spindle 28 is supported at its outer end 54, opposite end 42, by a cylindrical bore 56 which is carried in the closed end 58 of reaction chambers 12 and 14. Fluid leakage between spindle 28 and the interior of cylindrical bore 56 is prevented by providing one or more O-rings 60 or other suitable gasket in each of cylindrical bores 56. As stated earlier, spindle drive rotor 29 for transmitting a rotary input to spindle 28 is clamped to spindle 28 by nut 31 threaded onto threaded portion 27 of spindle 28. A thrust washer 62 is located around the outer end 54 of spindle 28 between spindle drive rotor 29 and a portion of the chamber outer shell 32 for contacting with both cylindrical bore 56 and spindle rotor 29. Thrust washer 62 limits axial movement between spindle 28 and reaction chamber 12 or 14. A spring washer 64 is placed around the outer end 54 of each spindle 28 between a circumferential collar 66 carried by spindle 28 and the interior chamber surface 68 adjacent cylindrical bore 56. Cylindrical collar 66 is of larger diameter than cylindrical bore 56 to axially fix spindle 28 from outward movement. Spring washer 64 acts against collar 66 and interior chamber surface 68 to bias spindle 28, and thus rotary plate 24 carried thereon, toward stationary valve plate 22 to further ensure a fluid-tight seating between rotary valve plate 24 and stationary valve plate 22 when valve assemblies 12 and 14 are in a closed position. When valve assembly 12 or 14 is open, spring washer 64 preloads spindle 28 to prevent fluid flow disturbances caused by any looseness or chattering of spindle 28 and rotary valve plate 24 in the axial direction due to vibration or g-loads within chemical mixing assembly 10.

Referring now to FIGS. 3, 4, and 5, a circumferentially extending slot or notch 26 is included on the periphery of each rotary valve plate 24. Notch 26 terminates at each of its two ends with a radially extending edge 70 or 72. Each radially extending edge 70 or 72 of notch 26 is for abutting engagement with a stop pin 74 which is carried longitudinally in each reaction chamber 12 and 14. Stop pin 74 limits the rotation of an associated rotary valve plate 24 to less than one complete revolution by abutting contact with either of the radially extending edges 70 or 72 of notch 26.

FIG. 4 illustrates valve assembly 18 of reaction chamber 12 in a closed position. Stationary valve plate ports 38 and rotary valve plate ports 43 are in a staggered or misaligned relationship to one another, thereby permitting a fluid-tight seal which prevents fluid flow between adjacent reaction chambers 12 and 16. In this position, stop pin 74 is shown in contact with edge 70 of notch 26.

Rotary valve plate ventilation port 76 is carried in each rotary valve plate 24 to communicate with spindle ventilation port 78 carried in each spindle 28, along with any other necessary ventilation channels, to provide fluid passageways which allow cavities 80 and 81 to be properly wetted.

To open valve assembly 18 from the closed position as shown in FIG. 4, rotor 29 and thus spindle 28 is first rotated in a direction which will advance spindle threads 44 into rotary valve plate 24. As shown in FIG. 4, spindle 28 of reaction chamber 12 is rotated in a clockwise direction, looking from the outer end 54 of spindle 28. Spindle 28 is axially fixed, as mentioned above; therefore, rotary valve plate 24 is pulled away from stationary valve plate 22 as spindle 28 is rotated. The abutting relationship between stop pin 74 and edge 70 of notch 26 prevents rotary valve plate 24 from rotating with spindle 28. When sufficient clearance between the formerly engaged rotary valve plate 24 and stationary valve plate 22 is achieved, the clockwise rotation of spindle 28 is stopped. Rotation applied to spindle 28 is then reversed and stopped after spindle 28 is rotated counterclockwise approximately 60 degrees. This effects rotation of the rotary valve plate approximately 60 degrees because of the light interference fit between spindle threads 44 and plate threads 46, subsequently moving edge 70 of notch 26 away from stop pin 74. This aligns rotary valve plate ports 43 with stationary valve plate ports 38 to create fluid passages through ports 38 and 43 as shown in FIG. 5.

To close valve assembly 18, rotor 29 is rotated counterclockwise, which rotates spindle 28 counterclockwise 60 degrees to position edge 72 of notch 26 against stop pin 74 to prevent rotary valve plate 24 from further rotation and to misalign ports 38 and 43. Continued counterclockwise rotation of spindle 28 moves rotary valve plate 24 axially, without rotation, against stationary valve plate 22 until rotary valve plate 24 is properly seated on stationary valve plate 22. When proper seating occurs, spring washer 64 will be loaded, and interconnecting adjacent chambers 12 and 16 will be sealed off from one another. In the event that one valve should be fouled by virtue of a solid between valve plates, the drive for that valve would simply stop and the other valve would fully operate to the closed position.

Valve action as desribed above is such that a minimum of fluid turbulence is induced during the opening and closing of the valve. Using a simple rotary motion input, the valve is opened by first backing the rotary valve plate away from the stationary valve plate axially, without rotation, and then by rotating the rotary valve plate to an open position. The valve is also closed during a simple rotary input which rotates the rotary valve plate for a limited time and then axially advances and seats the rotary valve plate, without rotation, against the stationary valve plate with a fluid-tight seal between adjacent reaction chambers. Thus, a single rotary input is converted to a combination rotary movement/axial movement output by the present valve which provides a low-turbulence fluid flow between adjacent reaction chambers.

Figure 6:
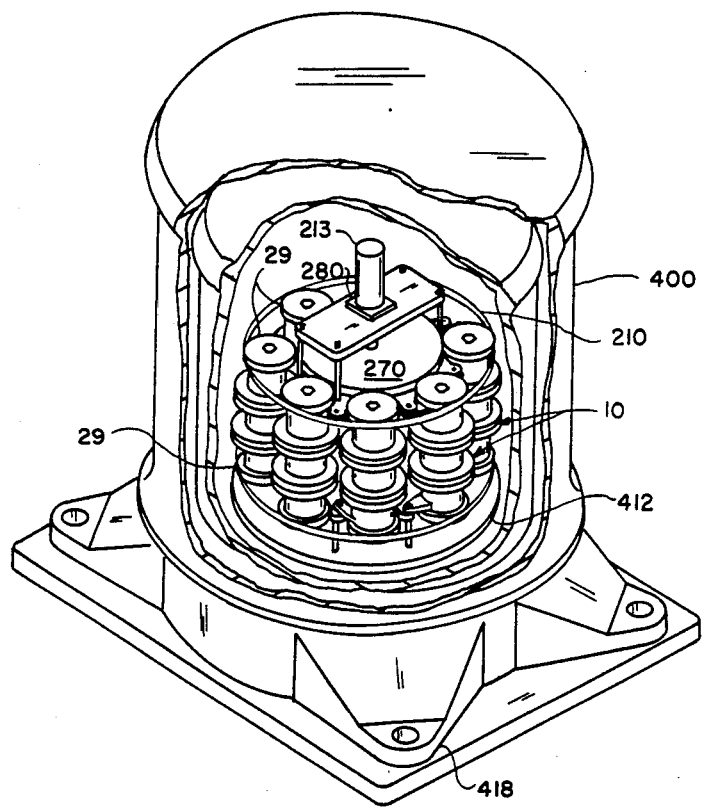
FIG. 6 is a perspective view, with portions cut away, of an application of the present invention.

As illustrated in FIGS. 2 and 6, mixing assemblies 10a–10h are vertically mounted in a parallel upper and lower frame plates 212 and 214, which are configured to arrange the mixing assemblies in a circle about a central, cylindrically-shaped frame member 216. Frame member 216 is constructed having upper and lower flanges 218 and 220 which in turn have clearance openings 222 for bolts 224 to threadably engage threaded openings 226 in upper frame plate 212 and threaded openings 228 in lower frame plate 214. This rigidly secures upper plate 212 and lower plate 214 to central frame member 216. A circular alignment boss 230 having a shoulder 232 with a diameter closely sized to the I.D. of frame member 216 is located on upper plate 212, with a like alignment boss 234 having a shoulder 236 being located on lower plate 214. During construction, shoulders 232 and 236 on bosses 230 and 234 abut inside regions 238 and 240 of frame member 216 to insure correct alignment between plates 212 and 214. Openings 242 and 244 in upper and lower plates 212 and 214, respectively, are adapted to receive bearings 246 and 246b and thrust washers 250 and 250b, which is turn support a drive shaft 254. Like components on end 256b of drive shaft 254 carry like numerals as end 256 but with the suffix "b" in FIG. 2. Drive shaft 254 is constructed at one end 256 having a boss 258 which in turn has a shoulder 260 which abuts surface 262 of bearing 246. Additionally, a smooth shaft region 264 is machined to closely fit the inside of bearing 246 along with a threaded portion 266 for receiving nut 268. Threaded portion 266 terminates with a motor coupling shaft 269, which is coupled to motor 213 by way of a flexible coupling 276.

A drive rotor 270 having an opening 272 sized to fit shaft region 264 of drive shaft 254 is rigidly clamped between nut and washer 268 and 271 and thrust washer 250. Drive rotors 270 and 270b are forced into frictional engagement with spindle rotors 29 of mixing assemblies 10a–10h by loading hoops 278 and 278b which cause upper and lower spindle rotors 29 to be driven simultaneously. Motor 213 having a shaft 215 is mounted as shown on a motor platform 280, which in turn is supported by hollow mounting posts 282. Posts 282 fit over studs 284, ends 286 of which are threadably mounted in upper mounting plate 212 and ends 288 of studs 284 being clamped to platform 280 by nuts 290. A flexible coupling 276 joins motor coupling shaft 269 of drive shaft 254 to motor shaft 215 and serves to absorb vibration from motor 213 and preventing it from being transmitted to upper and lower drive rotors 270 and 270b, respectively.

Upper and lower reaction chambers 12 and 14 of each valve unit are adapted to be mounted in frame assembly 210 between upper and lower mounting plates 212 and 214. Plates 212 and 214 are constructed as shown in FIGS. 1 and 2 as having a plurality of valve mounting lugs 300 and 302, respectively, and are rigidly connected as described earlier in a parallel relationship by flanged drum member 216. Additionally, lugs 300 and 302 are vertically aligned to enable connections which hold mixing assemblies 10a–10h generally parallel to drive shaft 254. Lugs 300 of top plate 212 are configured having a forked region 304 at the end region 306 of each lug 300, with aligned upper and lower openings 308 and 310 extending through both halves 312 and 314 of forked region 304. A pivot pin 316 connects end 318 of a pivot link 320 via opening 322 in link 320 between halves 312 and 314 of forked region 304. Pin 316 is retained in place by a conventional retainer clip 324. Opposite end 326 of link 320 has a large opening 328 with a diameter sized to rotatably fit mounting region 330 of upper chamber 12 of mixing assembly 10. A shoulder 332 of mounting region 330 abuts the lower surface of link 320 to prevent axial movement of link 320, which is held in place by a conventional retainer ring 334 clipped in a groove 336 in mounting region 330.

Lower chamber 14 is constructed having an integral pivot arm 340 with an opening 342 for receiving a threaded pivot pin 344, which is bolted by a nut 345 into a clearance opening 346 in mounting lug 302 of lower plate 214. A flange 348 on pine 334 loosely abuts upper surface 350 on arm 340, preventing axial movement of mixing assembly 10 while allowing mixing assembly 10 to rotate about pin 344. This mounting arrangement between upper and lower chambers 12 and 14 allows mixing assemblies 10a–10h to be reliably operated in the event of minor structural warpage or manufacturing defects by allowing mixing assemblies 10a–10h to axially shift, inwardly or outwardly rotate, or a combination of both, as will be further described.

To begin operation of frame and drive assembly 210, it will be assumed that all valve units are initially closed as shown for valve assembly 18 in FIGS. 1 and 3 and that the valve configurations require bidirectional rotary inputs as described above for opening. Operation for only one valve unit is described, it being understood that dual valve assemblies are housed together and are constructed and operated in a like manner. Power is initially applied to motor 213 to rotate drive shaft 254 and drive rotors 270 and 270b in a counterclockwise direction. This in turn rotates spindle rotors 29 in a clockwise direction, which causes spindle 28 to thread into threads 46 of valve plate 24 to axially move valve plate 24 into disengagement with stationary valve plate 22 as described. Power to motor 213 is then reversed, causing drive wheel 270 to rotate spindle wheel 29 60 degrees in a correspondingly reversed direction. This reversed rotational input rotates spindle 28 in a counterclockwise direction, and due to the light interference fit between threads 44 of spindle 28 and threads 46 of movable plate 24, plate 24 is rotated with spindle 28 until openings 43 in plate 24 are aligned with openings 38 in stationary plate 22, thus opening valve assembly 18. Closing of valve assembly 10 is accomplished by power being applied to motor 213 to effect a clockwise rotation of drive rotors 270 and 270b. This drives spindle rotors 29 in a counterclockwise direction, which rotates spindle 28 and movable plate 24 in a counterclockwise direction until shoulder 72 of slot 26 abuts stop pin 74, bringing openings 43 in movable plate 24 into a condition of misalignment with openings 38 in stationary plate 22. Continued counterclockwise rotation of spindle 28 axially moves plate 24 into engagement with stationary plate 22, thus closing and sealing valve assembly 18.

As mentioned earlier, if spindle rotors 29 or drive rotors 270 and 270b are misconstructed slightly acentric or if debris is introduced between spindle rotors 29 and drive rotors 270 and 270b, mixing assembly 10 can pivot outward or inward about lower pivot pin 344 and the connecting arrangement of upper pivot link 320. In addition, if debris is introduced or acentricity is encountered at only one spindle rotor of a mixing assembly 10 or drive rotors 270 or 270b, pivot pin 344 in opening 342 and opening 328 in link 320 are sized to permit limited angular movement of mixing assembly 10 with respect to drive shaft 254 to compensate for these irregularities.

As further illustrated in FIG. 6, a combined framework and drive assembly 270 as described above using a plurality of mixing assemblies 10a–10h is mounted inside a container 400. Studs 402 (FIG. 2) are threadably mounted in threaded openings 404 in lower frame plate 214, and hollow supports 406 are fitted over studs 402. Opposite ends 408 of studs 402 are fitted through clearance openings 410 in base adapter plate 412 of container 400 and rigidly held in place by nuts 414 threadably secured onto ends 416 of studs 402. This mounting arrangement securely holds assembly 210 to the base 412 of container 400, which in turn is held in position by bolts (not shown) and securing lugs 418 on container 400.

Operation of the drive mechanism and mixing assemblies of the present invention is such that little or no lash is incurred upon rotation or reversal of direction of the drive rotors, which contributes to the smoothness of operation necessary for reducing turbulence of fluids inside the reaction housings. Additionally, the above described invention is able to be reliably operated under adverse conditions, such as contamination by debris of drive rotors or spindle rotors or both, and construction defects contributing to acentricity of drive rotors and spindle rotors.

I claim:

1. A mixing system comprising:
    a plurality of flow mixing assemblies annularly positioned about a central axis, each mixing assembly comprising:
    a central chamber and first and second outer chambers positioned on opposite sides of said central chamber wherein said chambers are positioned generally in a line parallel with said central axis, with an outer side of said first chamber forming a first end of an assembly, and an outer side of said second chamber forming an opposite and second end of said assembly,
    first valve means for coupling said first chamber to said central chamber and including a first valve operating rotor positioned on an outer side of said first chamber at said first end of a said assembly, and
    second valve means for coupling said second chamber to said central chamber and including a second valve operating rotor positioned on an outer side of said second chamber at said second end of said assembly; and
    valve operating means including a first drive rotor centered about said central axis and in engagement with said first valve operating rotors and operating said first valve operating rotors in unison and a second drive rotor centered about said central axis and in engagement with said second valve operating rotors and operating said valve operating rotors in unison.

2. A mixing system as set forth in claim 1 including a first frame for supporting said first drive rotor and said first valve operating rotor and a second frame for supporting said second drive rotor and said second valve operating rotor and a frame member fixedly interconnecting said first and second frames.

3. A mixing system as set forth in claim 2 including a shaft positioned along said axis and connecting said first and second drive rotors.

4. A mixing system as set forth in claim 3 wherein said valve operating means includes a first hoop encircling said first operating rotors and a second hoop encircling said second operating rotors.

5. A mixing system as set forth in claim 4 including alignment means for adjusting the relative position of at least one valve operating rotor and a said drive rotor.

6. A mixing system as set forth in claim 1 wherein each said valve means comprising:
    a stationary valve plate being substantially perpendicular to a line parallel with said central axis and having a predetermined number of stationary valve plate ports spaced about said stationary valve plate and said stationary valve plate forming a wall between one of said outer chambers and a said central chamber;
    a rotary valve plate being substantially parallel to said stationary valve plate having a predetermined number of rotary plate valve ports;
    a longitudinally extending threaded spindle rotatably connected at one end to a said rotary valve plate for selective rotation both with and relative to said rotary valve plate, said spindle being carried at its other end by a said outer chamber for substantially axially-fixed rotation;
    a longitudinally extending stop pin positioned substantially perpendicular to and for engagement with said rotary valve plate for preventing said rotary valve plate from rotating a complete revolution upon rotation of said spindle;
    said spindle providing, upon its rotation, axial and limited rotational movement of said rotary valve plate relative to said stationary valve plate while maintaining said rotary valve plate substantially parallel to said stationary valve plate; and
    said spindle selectively providing, upon rotation, alignment between said rotary valve plate ports and said stationary valve plate ports, to thereby selectively provide an open fluid passage from a said outer chamber to a said central chamber.

7. A mixing system as set forth in claim 6 wherein said rotary valve plate is substantially a circular disc and further includes a circumferentially extending slot, having two ends, extending through a portion of the circumference of a said rotary valve plate, said slot terminating at each of said two ends with a radially extending edge for engagement with said stop pin.

8. A mixing system as set forth in claim 7 further comprising:
    a first ventilation port carried in said rotary valve plate;
    a second ventilation port carried in said spindle; and
    said first ventilation port and said second ventilation port being in communication with one another for providing a fluid passage from within a said outer chamber to said spindle through said rotary valve plate.

* * * * *